US010296886B2

(12) United States Patent
Matotek et al.

(10) Patent No.: US 10,296,886 B2
(45) Date of Patent: *May 21, 2019

(54) MOBILE PHONE AS POINT OF SALE (POS) DEVICE

(71) Applicant: Utiba Pte Ltd., Singapore (SG)

(72) Inventors: Richard Victor Matotek, Gisborne (AU); Justin Misha Ho, Singapore (SG); Andrew Charles Barnham, Mount Pleasant (AU)

(73) Assignee: Utiba PTE, Ltd., Singapore (SG)

( * ) Notice: Subject to any disclaimer, the term of this patent is extended or adjusted under 35 U.S.C. 154(b) by 424 days.

This patent is subject to a terminal disclaimer.

(21) Appl. No.: 15/174,852

(22) Filed: Jun. 6, 2016

(65) Prior Publication Data
US 2016/0283929 A1 Sep. 29, 2016

Related U.S. Application Data

(63) Continuation of application No. 14/224,046, filed on Mar. 24, 2014, now Pat. No. 9,361,610, which is a (Continued)

(51) Int. Cl.
G06Q 20/20 (2012.01)
G06Q 20/32 (2012.01)
(Continued)

(52) U.S. Cl.
CPC ........... *G06Q 20/204* (2013.01); *G06Q 20/20* (2013.01); *G06Q 20/24* (2013.01); *G06Q 20/32* (2013.01); *G06Q 20/322* (2013.01); *G06Q 20/325* (2013.01); *G06Q 20/3224* (2013.01); *G06Q 20/3229* (2013.01); *G06Q 20/3255* (2013.01); *G06Q 20/36* (2013.01); *G06Q 30/06* (2013.01); *G06Q 30/0601* (2013.01); *G07F 7/0886* (2013.01); *G07G 1/12* (2013.01);
(Continued)

(58) Field of Classification Search
None
See application file for complete search history.

(56) References Cited

U.S. PATENT DOCUMENTS

2003/0071115 A1 4/2003 Horn et al.
2003/0220074 A1* 11/2003 Wee ...................... H04W 88/04
455/11.1
(Continued)

FOREIGN PATENT DOCUMENTS

EP 1955265 A1 8/2008
WO 9913636 A1 3/1999
(Continued)

OTHER PUBLICATIONS

Office Action from Chinese Patent Application No. 200680046446.1, dated Oct. 25, 2016.
(Continued)

Primary Examiner — Paul Danneman
(74) Attorney, Agent, or Firm — Zilka-Kotab, P.C.

(57) ABSTRACT

A system and method for provisioning one or more value added services to a postpaid/prepaid mobile account and/or a postpaid/prepaid mobile device using a wireless communication device as a point-of-sale device, is disclosed.

4 Claims, 15 Drawing Sheets

Related U.S. Application Data continuation of application No. 11/503,903, filed on Aug. 15, 2006, now abandoned.

(60) Provisional application No. 60/733,266, filed on Nov. 4, 2005.

(51) Int. Cl.
```
G06Q 30/06      (2012.01)
G07F 7/08       (2006.01)
G07G 1/12       (2006.01)
H04W 4/24       (2018.01)
G06Q 20/36      (2012.01)
G06Q 20/24      (2012.01)
H04W 4/60       (2018.01)
H04M 3/42       (2006.01)
```

(52) U.S. Cl.
CPC ............... *H04W 4/24* (2013.01); *H04W 4/60* (2018.02); *H04M 3/42017* (2013.01)

(56) References Cited

U.S. PATENT DOCUMENTS

| | | | | |
|---|---|---|---|---|
| 2004/0133622 | A1* | 7/2004 | Clubb | G06F 9/505 709/200 |
| 2006/0253335 | A1 | 11/2006 | Keena et al. | |

FOREIGN PATENT DOCUMENTS

| | | | |
|---|---|---|---|
| WO | 0030044 | A2 | 5/2000 |
| WO | 0244976 | A2 | 6/2002 |
| WO | 03012717 | A1 | 2/2003 |
| WO | 2004010393 | A1 | 1/2004 |
| WO | 2004023353 | A1 | 3/2004 |
| WO | 2004053640 | A2 | 6/2004 |
| WO | 2004088641 | A2 | 10/2004 |
| WO | 2005086593 | A2 | 9/2005 |
| WO | 02071354 | A2 | 9/2012 |

OTHER PUBLICATIONS

Office Action from Phillippines Patent Application No. 1/2009/500836, dated Dec. 2, 2016.
Notice of Allowance from Mexican Patent Application No. MX/a/2008/005815, dated Nov. 15, 2016.
Office Action from U.S. Appl. No. 12/149,387, dated Feb. 13, 2017.
Final Office Action from U.S. Appl. No. 12/149,387, dated Mar. 7, 2016.
Examination Report from European Application No. 06 813 101.0, dated Dec. 16, 2015.
Examination Report from Canadian Patent Application No. 2,664,802, dated Apr. 18, 2016.
Office Action from Chinese Patent Application No. 200680046446.1, dated Jun. 27, 2016.
Office Action from Mexican Patent Application No. 2008/005815, dated Jun. 29, 2016.
Office Action from Malaysian Application No. PI 20081443, dated May 31, 2016.
Examination Report from the Intellectual Property Office of the Philippines Bureau of Patents for Application No. 1/2008/501323, dated Sep. 16, 2016.
Office Action from U.S. Appl. No. 12/149,387, dated Aug. 18, 2016.
Valcourt et al., "Investigating mobile payment: supporting technologies, methods and use," IEEE Int. Conf. Wireless and Mobile Computing, Networking and Communications, Aug. 2005, pp. 1-8.
Gao et al.,"P2P-Paid: A Peer-to-Peer Wireless Payment System," IEEE International Workshop on Mobile Commerce and Services, 2005, pp. 1-10.
Office Action from Canadian Patent Application No. 2,664,802, dated Feb. 15, 2017.
Wikipedia, "Digital Wallet", Apr. 26, 2017, pp. 1-4, as retrieved from https://en/wikipedia.org/wiki/Digital_wallet.

* cited by examiner

MOBILE PHONE AS POINT OF SALE (POS) DEVICE

RELATED APPLICATION

This application claims priority from U.S. Provisional Application No. 60/733,266, filed on Nov. 4, 2005, which is incorporated herein by reference.

FIELD OF INVENTION

The present invention relates generally to the enablement of wireless communication devices as transaction gateways. More particularly, the present invention relates to a system and method for enabling a wireless handset as a point-of-sale (POS) device.

BACKGROUND OF INVENTION

With the explosion of wireless phone access and usage, cellular phone service is fast becoming more and more available in developing countries where landline infrastructures are generally considered insufficient. Consequently, mobile service providers or operators are finding captive consumers in these countries for mobile phone services, particularly pre-paid phone cards.

The following prior art patent represent the state of the art for the transfer of digital data to a mobile device, and is hereby incorporated by reference:

U.S. Pat. No. 6,714,797 to Rautila discloses a system, method and computer program for ordering, paying for and downloading digital products to a mobile device. The mobile device accesses electronic shop server web sites that contain digital products for sale and hotspot network locations where these digital products may be downloaded to the mobile device via the short range transceiver located in the mobile device. Using the system, method and computer program disclosed therein, a user of a mobile device may download large amounts of digital data without incurring telephone or cellular phone charges.

However, a problem with the above-mentioned prior art system is its inflexibility. From the mobile operator's perspective, for example, such existing cellular pre-payment applications do not allow for the delivery of digital content to pre-pay mobile phone subscribers, so prevalent and growing in developing countries. Such current implementations of pre-payment systems lack flexibility, ease of implementation and responsiveness.

SUMMARY OF INVENTION

The present invention satisfies, to a great extent, the foregoing and other needs not currently satisfied by existing mobile commercial applications.

This result is accomplished, in an exemplary embodiment, by a system and method that activates the delivery of digital content and/or the pre-payment or post-payment of mobile operator and/or third party goods or services using a wireless communication device as a transaction gateway by one or more retailers or mobile operators. For ease of discussion, the term, "retailer", is used to refer to one or more mobile operator agents and/or independent retailers.

Using a mobile based application protocol, such as, but not limited to, short message service (SMS), wireless application protocol (WAP), the Java 2 Platform Micro Edition (J2ME), SIM Application Toolkit (STK), BREW, etc., the wireless communication device communicates with or browses an electronic mobile commerce server. The mobile commerce (M-Commerce) server provides access to a range of electronic or digital products supplied from the mobile operator and/or one or more third party providers available for purchase by the mobile phone service subscriber through one or more independent retailers and/or mobile operator agents. These third party providers may take the form of one or more specialized servers, such as a SMS center, a WAP gateway or a J2ME server, which operates in communication with the m-Commerce server.

In one aspect of the present invention, a value-added services (VAS) server is configured to provide enhanced digital content and/or enhanced services to the purchasing mobile phone service subscriber. Each enhanced digital content and/or service is packagable as a VAS content purchase of one or more enhanced services for pre-paid and post-paid mobile phone subscribers. In addition, each enhanced service is configurable to interoperate with one or more electronic platforms, such as a color ring tone platform, a post-paid billing platform, a vendor content delivery platform, and the like.

The VAS content or enhanced services include ring tones, music, virtual calling cards, and short message service (SMS) alert subscription services.

For instance, the VAS server preferably includes the provisioning of content directed to a variety of ring tones, logos, picture messages, video, music, games and other content. In this regard, the VAS server allows for content selection from an available list of content advertised by a mobile operator and/or retailer. The VAS server may also provide a subscription to a color ring tone service, allowing for song selection from an available list of musical content advertised by a mobile operator and/or retailer. Further, short message service (SMS) alert subscription services for news, sports, horoscope and such information may also be made available from the VAS server for ultimate pass through to the subscriber user. In addition, in instances where a mobile operator or third party provider employs its own calling card platform, the VAS server is configurable to provide virtual calling card or VAS card personal identification numbers (PINS) for use on the operator's or third party provider's platform.

Notably, these VAS server content or enhanced services are preferably modular in that each content/service may be enabled or disabled as desired on an individual basis.

In a preferred embodiment, the VAS server incorporates a content management system, which manages the server's operational functions. The content management system does not need to store or deliver VAS content to the target mobile phone service subscriber. It is integrated with the appropriate vendor's content delivery platform, which is responsible for the actual service provisioning and/or content delivery to the target mobile phone service subscriber. The VAS server, through communication with the M-Commerce server, facilitates access of a desired vendor's content and/or enhanced services to one or more retailers, and triggers the vendor's content delivery platform to send the content or enhanced services to the target subscriber. In this regard, the content management system assists in providing several functions, such as: the generation of centralized VAS codes; validation of VAS codes, management of VAS prices by retailer group or geographical region; management of VAS prices by retailer margin definition and calculation by retailer group or geographical region; availability of VAS by retailer group or geographical region; promotion of specific VAS by retailer group or geographical region; and other reporting.

Alternatively, rather than the content management system being connected to one or more separate vendor content delivery platforms such that the content is delivered by these platforms remotely, content may be stored locally on the content management system such that the content is delivered from the VAS server via the content management system directly.

The M-Commerce server also manages the interoperability of the VAS server with other platforms, such as the mobile operator billing system, the content provider VAS platform, etc. In a preferred embodiment, each retailer is equipped with electronic wallet accounts, which has prepaid credits. When a purchase is requested, the value is deducted from the retailer's pre-paid e-wallet account. The retailer's e-wallet account also operates with a credit whereby retailers may settle accounts with mobile operators periodically.

In another aspect of the present invention regarding a logical view of the server configuration, the system of the present invention comprises an application layer, a middleware layer and an interface layer. The application layer performs all of the transaction processing functions, and manages integration with operator network entities, third party provider network entities and the application layer modules and sub-systems. The middleware layer standardizes and manages communications between all external network entities and the modules and sub-systems of the application layer. The interface layer comprises one or more interface modules written for each specific target platform, for example. Each interface module implements a specific communications protocol, facilitating plug-and-play integration with third party provider network entities and mobile operator network entities.

More specifically, the application layer comprises three modules: an m-Commerce server, and e-Wallet server and a VAS server. Each of the three server modules are composed of sub-systems. For example, the m-Commerce server module comprises four sub-systems or four main functional blocks: agent registration and management; parsing & end-to-end transaction management; transaction log, audit and reporting; and settlement and reconciliation. The e-Wallet server module comprises three sub-systems: e-Wallet transaction management; e-Wallet stored value; and agent authentication and security. And the VAS server module is composed of five sub-systems: VAS transaction management; content mapping; retailer verification; VAS pricing and retailer commission; and PIN database. Each of these sub-systems is configured to perform intended functions required of the respective server module.

The middleware layer is best described by the complexity of core functions it manages, such as multi-threading management queuing, message delivery and recovery, system monitoring, data collection, transaction management and logging, and the like. It lies between the application layer and the interface layer.

The interface layer is composed of a plurality of interface modules that incorporate features designed to manage the transaction load on the target network entity and simplify integration of third party network entities or mobile operator network entities. In this embodiment, the interface modules comprise a SMSC interface; a WAP interface, a content interface; a color ring tone interface; an information alert interface; and a postpaid interface, each of which preferably corresponds to a respective platform or network entity it supports.

The configuration of the application layer, middleware layer and interface layer modules and sub-systems provision a system and method for enabling a wireless communication device as a point-of-sale device that is highly scalable, robust and secure. As to scalability, the modules are designed to act as 'stand-alone' processes that communicate with other modules, preferably via XML messages over TCP/IP sockets. The modules may reside on the same server, or be distributed over a network or a cluster. Modules are also configurable to send messages to multiple modules, thus allowing load balancing throughout the three architecture layers. Applications may also be distributed across multiple servers. In addition, multiple instances of the modules and interfaces may be configurable in fail-over mode across multiple stand-alone or clustered servers.

As to robustness, each module provides shutdown and re-start procedures that allow pending transactions to be processed if possible. In addition, if a module sends a message to another module, and that transaction fails, it will automatically attempt to re-send the message to a redundant module. Also, if an attempt to re-send the transaction also fails—such as in the case of absolute failure—then the message is spooked to disk, and an internal monitoring thread will attempt to re-send the message at a later time.

As to security, secure communications throughout the architecture of the present invention ensures that sensitive data is not compromised. Module-to-module communications are preferably encrypted to ensure message integrity. Supported encryption algorithms include 3DES, Blowfish, AES, SSL and the like. Supported hashing algorithms (for message integrity checking) include MD5, SHA1 and the like. Links with external entities are also preferably encrypted with any of the above software based algorithms. Hardware based encryption modules (HSM) may be integrated to encrypt transactions with external entities.

There has thus been outlined, rather broadly, the more important features of the invention in order that the detailed description thereof that follows may be better understood, and in order that the present contribution to the art may be better appreciated. There are, of course, additional features of the invention that will be described further hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and being practiced and carried out in various ways. Also, it is to be understood that the phraseology and terminology employed herein are for the purpose of description and should not be regarded as limiting.

As such, those skilled in the art will appreciate that the conception upon which this disclosure is based may be readily utilized as a basis for the designing of other structures, methods and systems for carrying out the several purposes of the present invention. It is important, therefore, that equivalent constructions insofar as they do not depart from the spirit and scope of the present invention, are included in the present invention.

What is more, the detailed description that follows may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, entities, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as providing, inputting, confirming or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to a system for performing these operations. This system may be specially constructed for the required purpose or its may comprise a general purpose computer as selectively activated or reconfigured by a computer program stored in a computer. The procedures presented herein are not inherently related to a particular computer or other system or apparatus. Various general purpose machines may be used with programs written in accordance with the teachings herein, or it may prove more convenient to construct more specialized system/apparatus to perform the required method steps. The required structure for a variety of these machines will appear from the description given.

For a better understanding of the invention, its operating advantages and the aims attained by its uses, references should be had to the accompanying drawings and descriptive matter which illustrate preferred embodiments of the invention.

DETAILED DESCRIPTION OF PREFERRED EMBODIMENTS

Figure 1:
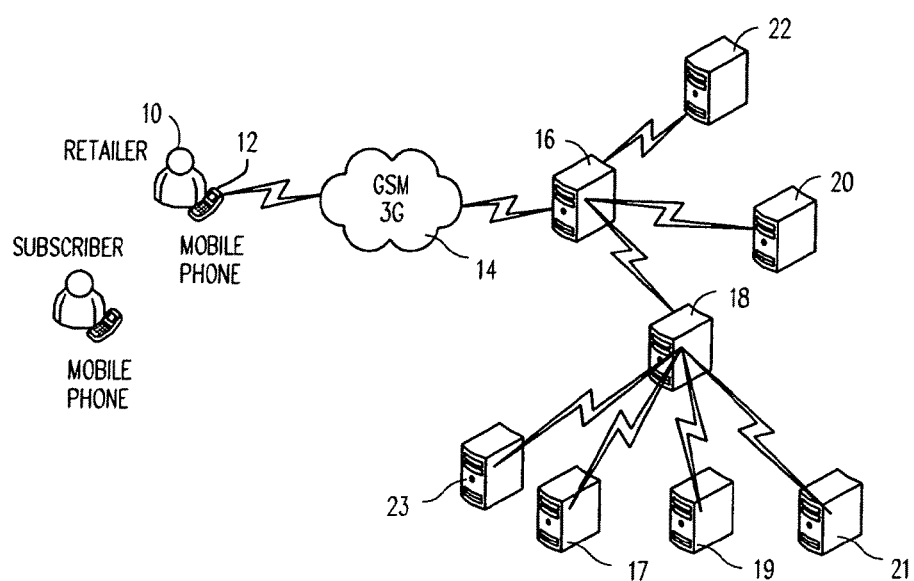
FIG. 1 is a physical view of the server configuration of a system for enabling a wireless communication device as a point-of-service device, in accordance with a preferred embodiment of the present invention.

Referring now to the figures, wherein like reference numbers indicate like elements, in FIG. 1 there is shown an exemplary embodiment of a system for enabling a wireless communication device as a point-of-sale (POS) device.

As depicted in a physical view of the system's server configuration, the wireless communication device 12, such as a mobile phone, is used by a retailer or mobile operator 10 as a POS device to access an electronic mobile commerce (M-Commerce) server 16 through a 2.5G, third generation (3G) or later global system for mobile communication (GSM) 14. Mobile operator network entities, such as a SMS center, WAP gateway and a J2ME server, are preferably collocated at 14 and communicate with the M-Commerce server 16 through SMS center and WAP gateway interfaces. The M-Commerce server 16 communicates via a middleware layer to an e-Wallet server 22, pre-paid top-up distribution server 20 and a VAS server 18. The VAS server 18 in turn communicates through interfaces with target platforms 23, 17, 19, 17, which may be owned by one or more third party providers or mobile operators.

For ease of discussion, retailer 10 is used to refer interchangeably to one or more mobile operator agents and/or independent retailers.

The M-Commerce server 16 provides a menu of one or more electronic or digital products. These products may be supplied by the retailer, the mobile operator itself, or from one or more content providers represented as value-added services (VAS) content and/or enhanced services, which operate in tandem with a mobile operator's system(s).

More specifically, the M-Commerce server 16 provides the operational logic to manage an end-to-end M-Commerce transaction, including but not limited to: an interface logic—such as wireless application protocol (WAP), short message service (SMS), Java 2 Platform Micro Edition (J2ME), SIM Application Toolkit (STK), etc.—for integration with a mobile operator's access channels; parsing logic to receive and process transactions from various access devices using the above-mentioned interface logic; a transaction management logic to control performance of desired transactions, such as content purchase transactions, enhanced service subscription transactions, enhanced service purchase transactions and the like; integration capabilities to facilitate integration with one or more sub-systems, such as the VAS server 18, pre-paid top-up distribution server 20 and e-wallet server 22; and other operational support capabilities including but not limited to configuration, reporting, auditing, etc.

The VAS server 18 provides the operational logic to manage the transactional processing that occurs between the retailer 10 and any third party provider platform, such as the color ring tone platform 17, vendor content delivery platform 21 and information alert platform 23 depicted in FIG. 1. The VAS server also manages the transactional processing that occurs between the retailer 10 and the mobile operator's platform, such as the post-paid billing platform 19.

More specifically, the VAS server 18 provides operational logic, which includes but is not limited to: an interface logic for integration with a mobile operator's access channels and a third party provider platform; a transaction management logic to control performance of desired transactions, such as content purchase transactions, enhanced service subscription transactions, enhanced service purchase transactions and the like; and other operational support capabilities including but not limited to mapping and validation of mobile operator content ID, authenticating authority for retailers to sell specified content and/or enhanced services, establishing retail prices and commissions, system configuration, reporting, auditing, etc.

The color ring tone platform 17, which preferably exists in the network of a mobile operator or third party provider, is hardware and software used to house or store the audio files of the color ring tone content. In the provisioning of color ring tone services, the color ring tone platform 17 is interconnected to a mobile operator's switching infrastructure to substitute the audio file of a selected song for another network ring tone in a subscriber's handset.

The post-paid billing platform 19, which preferably exists in the network of a mobile operator or third party provider, is hardware and software used to capture call records, generate accounts and track payments for post-paid services.

The vendor content delivery platform 21, which preferably exists in the network of a mobile operator or third party provider, is hardware and software used to house or store digital content. In the provisioning of digital content, the vendor content delivery platform 21 is interconnected to a mobile operator's switching infrastructure to deliver selected content to a subscriber's handset.

The information alert platform 23, which preferably exists in the network of a mobile operator or third party provider, is hardware and software used to house or store information and data. In the provisioning of alert subscription services, the information alert platform 23 is interconnected to a mobile operator's switching infrastructure to deliver selected subscription information alerts to a subscriber's handset.

Figure 2:
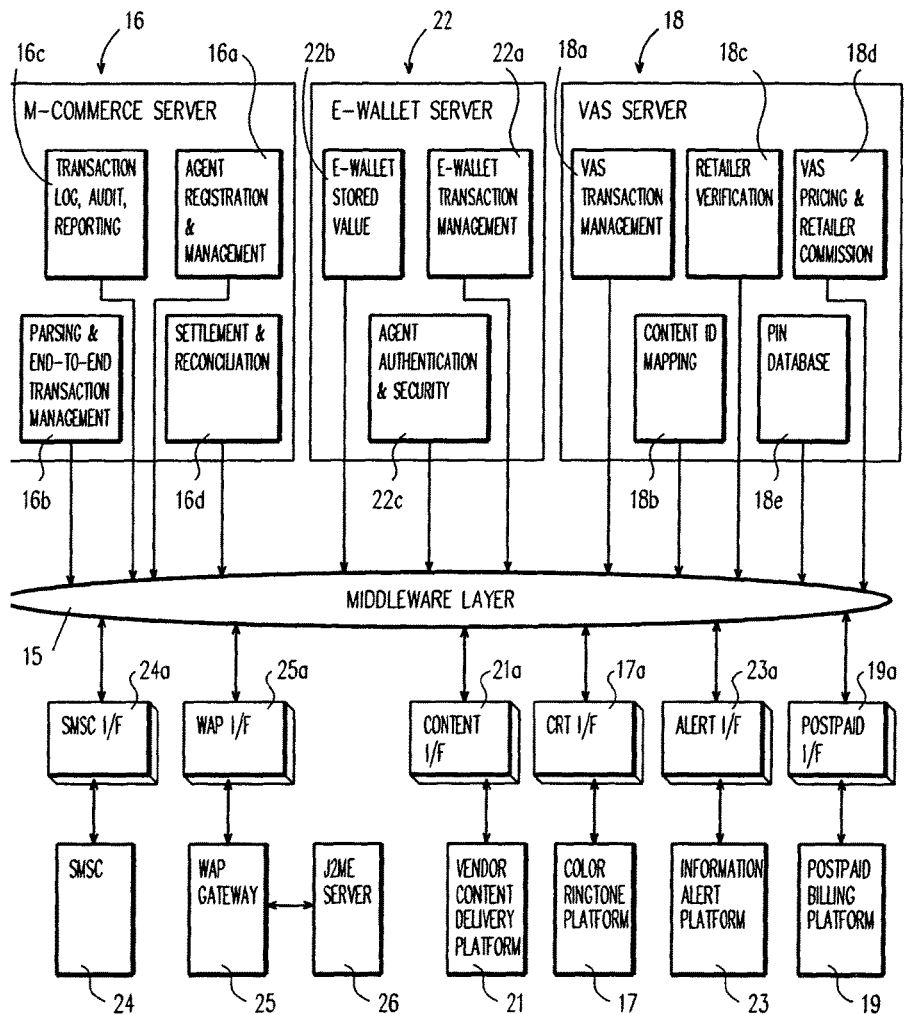
FIG. 2 is a logical view of the server configuration of the system of FIG. 1.

A preferred embodiment of a logical view of the server configuration of the system of the present invention is shown in FIG. 2. The application architecture performs all of the transaction processing functions, and manages integration amongst and between the server modules 16, 18, 22, its sub-systems, the middleware 15, the various third party network platforms 17, 21, 23, and any mobile operator network entities, such as the postpaid billing platform 19, the SMS center 24, the WAP gateway(s) 25 and the J2ME server(s) 26. The application architecture also manages the back-end administration, reporting and monitoring infrastructure.

Preferably, the middleware layer 15, and the SMS center and WAP interfaces 24*a*, 25*a* are collocated with the M-Commerce server 16. Similarly, the middleware layer 15 and the interfaces 21*a*, 17*a*, 23*a*, 19*a* are preferably collocated with the VAS server 18. Finally, the middleware layer 15, in the absence of any interface components, is collocated with the e-Wallet server 22.

As depicted in FIG. 1, the M-Commerce server 16, e-Wallet server 22 and VAS server 18 may be viewed as the three primary modules developed to support a VAS content and enhanced services application. This is the application layer. These modules contain the business logic for each particular solution, and are separated into discrete functional blocks, which interact with each other and with the middleware and interface layers.

For example, the M-Commerce server 16 includes four functional blocks; namely, an agent registration and management block 16*a*, a parsing and end-to-end transaction management block 16*b*, a transaction log, audit, reporting block 16*c*, and a settlement and reconciliation block 16*d*.

The agent registration and management block 16*a* provides the business logic to register and manage an agent's (i.e. retailer's) virtual account. Block 16*a* also includes, but is not limited to, the operational logic that: performs the agent registration function, and allocates the agent against a group of agents. Preferably, for example, each retailer has parameters that govern their characteristics and operations, such as sales commissions, maximum and minimum e-wallet balance caps, maximum transaction volume caps, maximum transaction value caps, products they are authorized to sell, and the like. An operator generally has a set number of combinations of these parameters, such as three or four commission structures. For ease of management, the agent registration and management block 16*a* enables the operator to create one or more groups where each group represents one or more sets of parameter combinations. Thus, when registering a retailer, the operator may assign a retailer to a group, and the retailer automatically adopts the characteristics for that group. In this way, the retailer registration process is streamlines (i.e. less data to enter for each specific retailer) and wholesale changes to a large number of retailers may be implemented by changing the group parameters.

The parsing and end-to-end transaction management block 16*b* provides the business logic to manage the end-to-end transaction flow and interaction between all three modules 16, 22, 18. Block 16*b* also includes, but is not limited to: an interface logic to integrate with the mobile operator or third party provider access channels, such as SMSC 24, Wireless Application Protocol (WAP), etc.; a parsing logic to receive and process transactions from the various access devices using the protocols associated with one or more source platforms such as SMSC 24, WAP gateway 25, J2ME server 26, etc.; a decryption algorithm to decrypt incoming messages; a transaction management logic to control the end-to-end transaction flows; software for integration with the other modules, such as the e-Wallet server 22 and the VAS server 18; and software to provide all of the operational support functions including, but not limited to, system configuration, reporting, auditing, etc.

The transaction log, audit and reporting block 16*c* provides the business logic to capture and store the end-to-end transaction data. This block 16*c* also includes, but is not limited to: transaction data logging functions for end-to-end transactions; audition functions; and reporting functions.

The settlement and reconciliation block 16*d* provides the business logic to calculate transaction fees and commissions for all parties to the transaction in real time. It supports fixed fee or variable percentage transaction amounts, or both.

The e-Wallet server 22 comprises three main functional blocks; namely, the e-Wallet transaction management block 22*a*, the e-Wallet stored value block 22*b*, and the agent authentication and security block 22*c*. The e-Wallet transaction management block 22*a* provides the business logic to manage the interaction with the agent's or retailer's virtual account. The capabilities of this block 22*a* include, but are not limited to: routing transactions from/to the M-Commerce server 16 and the VAS server 18; transaction data logging for e-Wallet auditing and reporting.

The e-Wallet stored value block 22*b* provides the operational logic to manage the intra-actions of an agent's or retailer's virtual account. The capabilities of this block 22*b* includes, but are not limited to: storing current e-Wallet account balances, status and information; responding to balance inquiries from the M-Commerce and VAS servers 16, 18; reserving funds while a transaction is being processed by either of the M-Commerce and VAS servers 16, 18; and committing funds to or from the virtual account once a transaction is successfully completed.

For ease of discussion herein, it is assumed that a retailer's electronic wallet has sufficient credits for the desired transaction. Alternatively and/or optionally, the retailer 10 may use non-electronic mechanisms to effect a mobile phone related sales transaction, such as selecting the desired mobile phone-related product from a local/remote catalog.

The agent authentication and security functional block 22*c* provides the business logic for managing authentication and security functions. The capabilities of block 22*c* include, but are not limited to: storing an agent's or retailer's M-Commerce server identification number (M-PIN) in a secure manner; and responding to agent/retailer authentication requests from the other modules 16, 18, including validation of the M-PIN.

The last of the three primary modules depicted in FIG. 2 is the VAS server 18, which comprises five main functional blocks; namely, a VAS transaction management block 18a, a content mapping block 18b, a retailer verification block 18c, a VAS pricing and retailer commission block 18d, and a PIN database block 18e.

The VAS server transaction management block 18a provides the business logic to manage the transaction aspects of delivery of the content or enhanced service. The capabilities of block 18a include, but are not limited to: routing transactions from/to the M-Commerce and e-Wallet servers 16, 22; routing transactions from/to the interfaces 21a, 17a, 23a, 19a for the platforms 21, 17, 23, 19, respectively; and transaction data logging for VAS service auditing and reporting.

The content ID mapping block 18b provides the business logic to manage the confirmation aspects of delivery of the content or enhanced service. The capabilities of block 18b include, but are not limited to: generating centralized VAS codes for mobile operators or third party providers; validating operator/third-party provider VAS codes; mapping operator VAS codes to content; and mapping operator VAS codes to enhanced service provider specific content codes.

The retailer verification functional block 18c provides the business logic to manage the services that an agent/retailer is able to sell. The capabilities of block 18c include, but are not limited to: determining the availability of value-added services by region and/or by retailer group; and promoting specific value-added services, such as a 'Top 5' or 'Top 10' services, by region and/or by retailer group.

The VAS pricing and retailer commission block 18d provides the business logic to manage the charges and commissions for the agent/retailer. The capabilities of block 18d include, but are not limited to: managing VAS prices by region(s) and/or retailer distribution trees, such as by retailer group; and defining and calculating retailer margin by region (s) and/or retailer group(s).

Lastly, the PIN database block 18e provides the business logic to manage the sets of PINs for the services being offered. The capabilities of this block 18e include, but are not limited to: segmentation of PINs on a per service basis; safe storage of PINs; serving of PINs to the requesting module(s); and the marking of PINs as 'used' once successfully served.

Communication between the server modules 16, 22, 18, the mobile operator network entities 24, 25, 19 and the third-party service provider network entities 21, 17, 23, are accomplished through interfaces 24a, 25a, 19a, 21a, 17a, 23a, respectively, and a middleware layer 15.

For each of discussion, the interfaces 24a, 25a, 19a, 21a, 17a and 23a comprise an interface layer, which implements a specific communications protocol. As depicted, each interface is used to separate the connection logic from the business logic, thereby simplifying the integration of mobile operator and third-party network entities. This provides a plug-and-plug environment for standards based network entities.

In this regard, a primary function of the interface layer is three-fold: (1) to manage the communication sessions with the target platform, such as the color ring tone platform 17; (2) to convert a VAS server 18 request to the required target platform format and send it to the intended target platform; and (3) to interpret the target platform response, and convert that response to an appropriate response for the server modules 16, 22, 18.

Notably, each interface 24a, 25a, 21a, 17a, 23a and 19a is written for each specific target network entity. For example, the alert interface 23a is written for communication with the information alert platform 23. Similarly, the postpaid interface 19a is written for communication with the postpaid billing platform 19. Each interface also incorporates features designed to manage the transaction load on a target network entity. This facilitates a seamless plug-and-play integration.

The middleware layer 15 is configured to standardize and manage the communications between all mobile operator and third-party network entities, and the three server modules 16, 22, 18. It manages core functions and systems, such as: a message-passing system between multiple server modules 16, 22, 18 and the interface layer, preferably using XML; an internal queuing system that routes messages from the server modules 16, 22, 18 and interface layer to internal worker threads; a monitoring system that monitors the status of third-party network connections, internal threads, queues, etc. (with event alarm and logging); initialization and (graceful) shutdown sequences; debug and audit logging; and data collection system that collects performance statistics.

Figure 3:
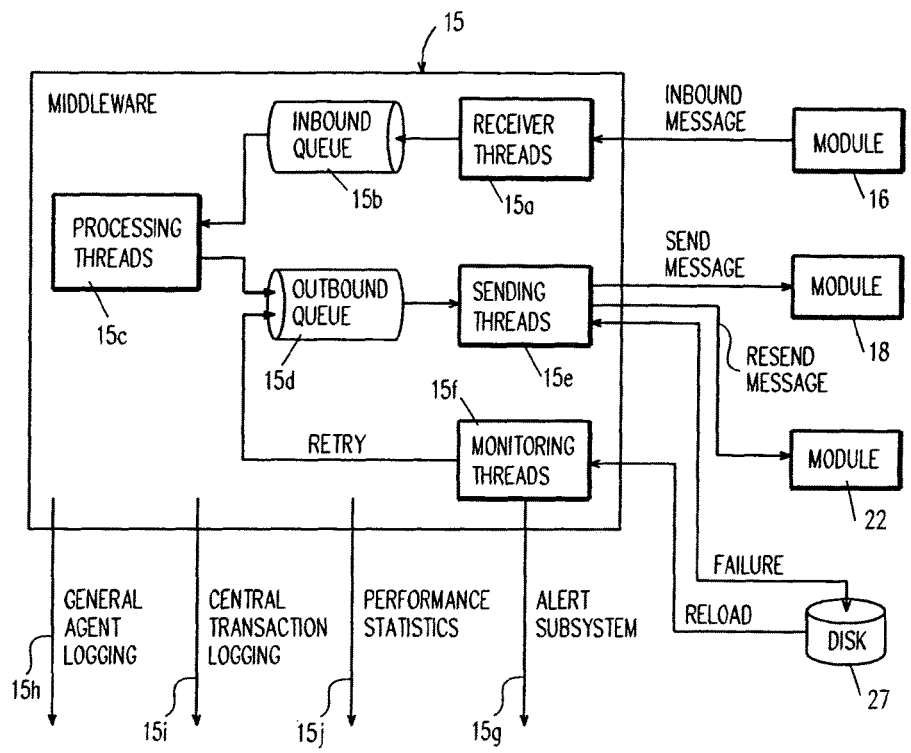
FIG. 3 is a diagram of the middleware of FIG. 2.

A more detailed discussion of the transaction management, system monitoring and transaction logging attributes of the middleware layer 15 may be better appreciated with reference to FIG. 3.

The transaction management attributes of the middleware layer 15 incorporate a range of features to guarantee delivery of transactions so that transactions are never lost. As depicted, messages received from the server modules 16, 18, 22 by the middleware 15 are through dedicated receiver threads 15a. These messages are placed in an inbound queue 15b to await processing. A dedicated worker thread 15c takes the message off queue and processes it. If a response it to be sent, or if the message is to be passed on, then it is placed in an outbound queue 15d. A pooled collection of sending threads 15e then attempt to send the message to its destination server module 18, for instance.

The system monitoring attributes of the middleware 15 incorporates a range of features that complement transaction management and optimize the performance of the layer. For example, monitoring threads 15f keeps track of all compliance aspects of messages within the server modules 16, 18, 22 and the middleware 15. These compliance aspects include thread activity, message sending and receiving, queue sizes, internal processing statistics, message delivery re-tries, message aging and the like. In addition, a built-in e-mail and SMS alerting system 15g provides notification of important internal events. SMS alerting is possible through Short Message Peer to Peer (SMPP), Simple Network Paging Protocol (SNPP), Universal Computer Protocol (UCP), Computer Interface to Machine Distribution, version 2 (CIMD2) and other protocols. Alerting systems may also include Interactive Voice Response (IVR) systems and Multimedia Messaging System (MMS) with graphical illustrations, if desired. Two other system monitoring attributes include dynamic load balancing (in case of overloading) and dynamic failure recovery (in case of failure).

The transaction logging attributes of the middleware layer 15 provides a common capability to capture and safe-store data for critical steps in the transaction processing to avoid loss of critical data. Inbuilt even and audit logging to disk 27 provides a continuous trace of message progress. General agent/retailer logging 15h and central transaction logging 15*i* provides safe storage of critical logs and raw data to a Universal Transaction Logger (UTL) server (not shown).

The UTL server is a centralized data collection system that captures performance statistics 15*j* and transaction data in a standardized format so that it is presented in a unified view and extracted by reporting tools. Each transaction is preferably identifiable by service type, transaction type (e.g. balance inquiry, top-up, etc.), date/time, MSISDN, and response code. A web-based administration graphical user interface (GUI) allows operations and business users to view a range of scenarios, such as viewing an individual service by MSISDN or viewing all services by MSISDN. Preferably, each scenario is controlled by one or more filters.

In a preferred embodiment, a reporting module communicates with the data collection system to extract data for any individual application, or to consolidate data across all applications. Controlled by one or more filters, the reporting module may create reports for a range of scenarios, such as a report on aggregated services by transaction type (e.g. all top-up transactions by service type). Reports may also be created on aggregated services by retailer/agent or on individual service(s). Through the reporting module, mobile operators or third-party service providers may create their own reports also.

A more detailed description is now presented regarding operation of the architecture of the present invention to activate delivery of various content and services using a wireless communication device as a transaction gateway.

Figure 4A:
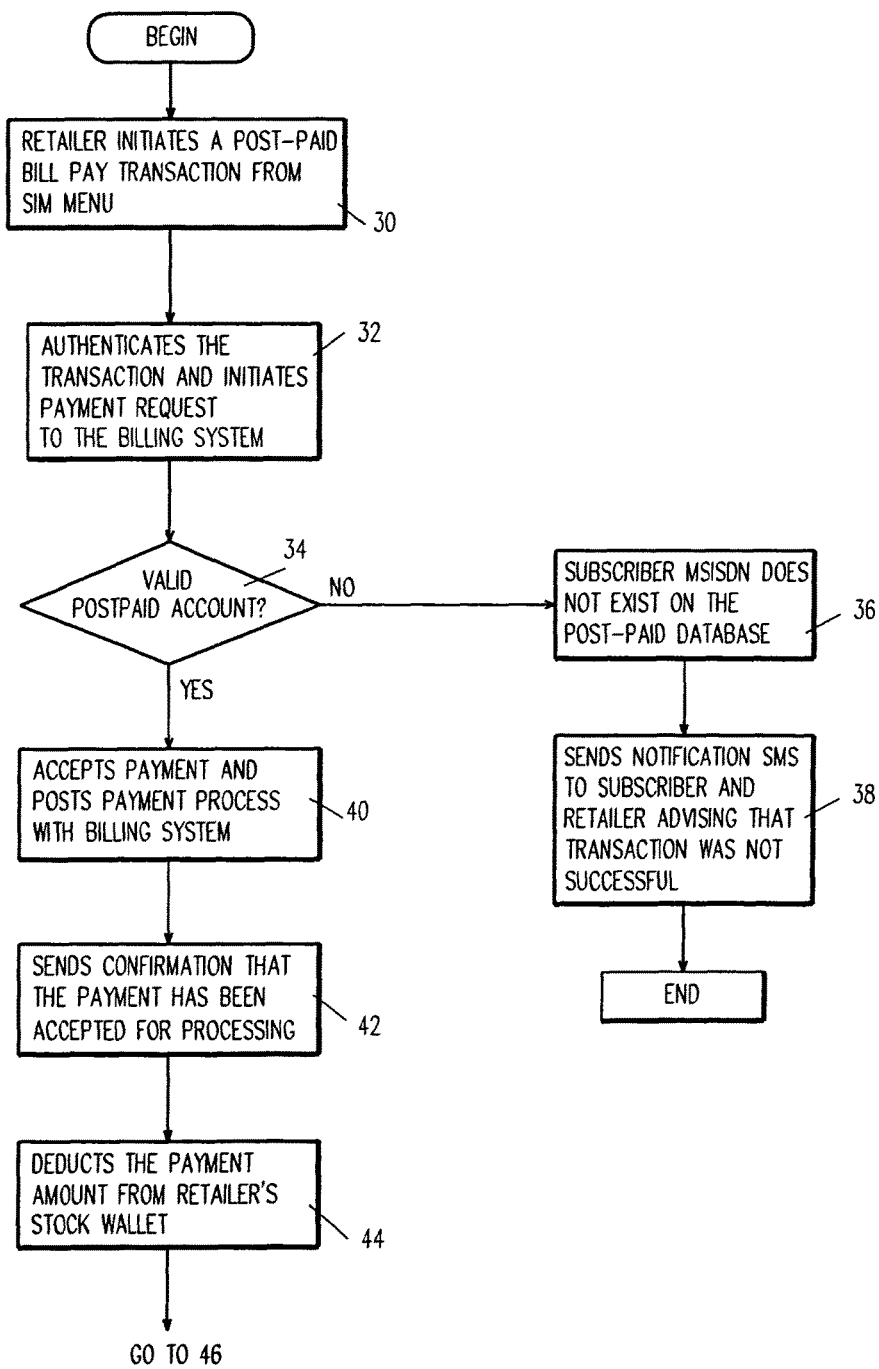
FIGS. 4A and 4B show a flowchart of a post-paid bill pay transaction using the system of FIGS. 1 and 2.
Figure 4B:
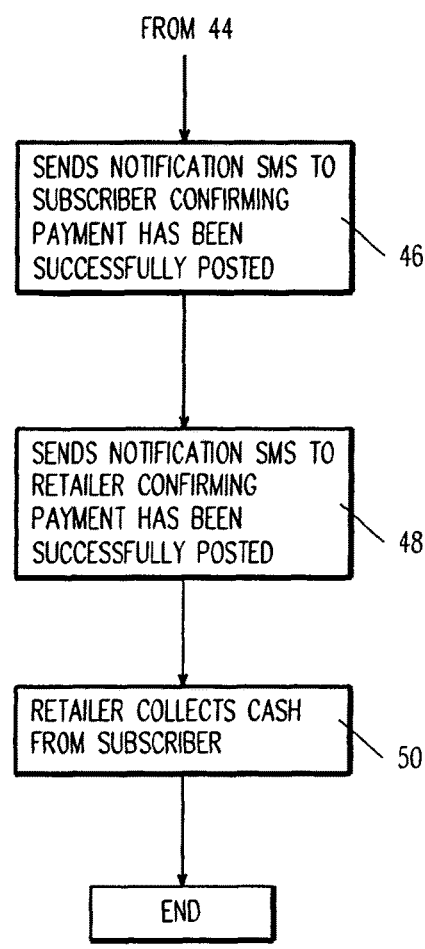

Operationally, and with respect to FIG. 4, there is shown a flow chart of a post-paid bill payment transaction using the system of the present invention that enables a mobile phone service subscriber to pay their mobile phone operator's post-paid account using physical currency (i.e., pesos, rupees, pounds, etc.) over the counter to an authorized retailer 10.

In the exemplary FIG. 4 transaction, the retailer 10 uses a mobile phone 12 as a point-of-sale device to initiate a post-paid bill pay transaction, as at operation 30. In a preferred embodiment, bill pay transactions are performed using a SIM menu by retailers 10 that have authorized electronic wallet permissions and SIM security. The SIM is a subscriber identity module, or a contact-based smart card, that is inserted into a mobile device's handset. The SIM is configured to store an application on it that is controlled by a menu that is displayed on the mobile device's handset screen, and controlled by the handset's navigation keys.

Notably, a transaction may be performed using any desired user interface on a variety of mobile based application protocols, such as, but not limited to, short message service (SMS), wireless application protocol (WAP), the Java 2 Platform Micro Edition (J2ME), BREW, etc. Each of the transactions discussed in FIGS. 3 through 7 may employ any desired interface/protocol.

Operation 30 is performed when a mobile phone service subscriber provides the retailer 10 with his/her post-paid mobile phone number, the amount being paid, and a bill reference number. Using the mobile phone device 12, the retailer 10 accesses a M-Commerce server 16 menu.

Preferably, the SIM application displays the appropriate prompts to the retailer 10 via the SIM menu, such as "Please enter Subscriber Postpaid mobile no."; "Confirm Subscriber Postpaid mobile no."; "Please enter bill reference no."; "Please enter payment amount"; "Enter your M-PIN"; and "Confirm payment of <amount> for Postpaid no. <MSISDN> with ref no. <bill reference no.>". In other words, the retailer 10 selects the corresponding options from the SIM menu, and enters the details provided by the subscriber in operation 30. The retailer 10 then enters its M-Commerce server identification number (i.e. M-PIN) and confirms the transaction.

The SIM application constructs an encrypted bill pay short message service (SMS) containing the entered data, and sends the message to a SMS center 24, which in turn routes the bill pay message to the M-Commerce server 16. The M-Commerce server 16 determines that the bill pay message is a bill pay transaction, decrypts the message, and authenticates the retailer's 10 details on the e-Wallet server 22, as at operation 32.

If there are sufficient funds in the retailer's electronic wallet account, the e-wallet server 22 holds the payment amount in reserve and the M-Commerce server 16 initiates a payment request (operation 32) to a billing platform 19 of the mobile operator 10 through the VAS server 18. Preferably, the details of the payment request include information directed to the mobile phone service subscriber's post-paid mobile number (MSISDN), the payment amount, and bill reference number. Optional information may include the payment type and a unique M-Commerce server transaction number.

At operation 34, the decisional issue is whether a valid post-paid account exists. Here, the billing platform 19 of the mobile operator verifies that the mobile phone service subscriber's MSISDN is a post-paid account by cross-referencing the details of the payment request with information in a post-paid database. If no matching data is found, the billing platform 19 notifies the VAS server 18 of the mismatch, as at operation 36. The VAS server 18 notifies the M-Commerce server 16, which in turn sends a notification SMS message to the retailer 10 and subscriber advising of the failure of the submitted request (operation 38). An example of a subscriber notification SMS message for a failed transaction may read: "<Given name>, there has been a problem processing your bill payment submitted on <submission date> at <submission time>. Please call customer service on <phone number>. Trans # <transaction ID number>."

On the other hand, if the subscriber is verified as a valid post-paid account, then the billing platform 19 accepts the VAS Server's 18 payment request and posts the payment process, as at operation 40.

Next, at operation 42, the billing platform 19 sends a confirmation message to the VAS server 18 that payment has been accepted for processing. The VAS server 18 notifies the M-Commerce server 16, which instructs the e-wallet server 22 to deduct the appropriate payment amount from the retailer's e-wallet account (operation 44).

The M-Commerce server 16 also constructs a notification SMS message to the mobile phone service subscriber (operation 46) and retailer 10 (operation 48) confirming that payment has been successfully posted. A successful SMS notification message sent to the post-paid mobile phone service subscriber preferably contains information on the customer name, date/time of payment, the retailer's MSISDN, the M-Commerce server's transaction number, and the payment amount. An exemplary form may read: "<Given name>, your bill payment submitted on <submission date> at <submission time> has been successfully processed. Your receipt number is <post-paid receipt #>. Trans # <transaction ID number>."

Similarly, a successful SMS notification message sent to the retailer 10 preferably contains information on the date/time of the payment, the subscriber's MSISDN, the M-Commerce server's transaction number, and the payment amount. An example retailer notification SMS message for a successfully accepted transaction may read: "On <date> at <time> you submitted <currency amount> for post-paid bill payment of <subscriber MSISDN>. Trans #<transaction ID number>."

At this juncture, the mobile operator or retailer 10 accepts cash from the mobile phone service subscriber, operation 50.

It is worth noting that any or all of the VAS content and/or enhanced services, whether digital content or subscription services, is available to pre-paid or post-paid mobile phone subscribers by delivering physical currency over the counter to an authorized retailer 10. Each VAS content or enhanced service is available singly or bundled, and may be enabled or disabled singly or bundled as desired. Therefore, each VAS content or enhanced service is preferably configured as its own content/service delivery platform on the VAS server 18.

Figure 5A:
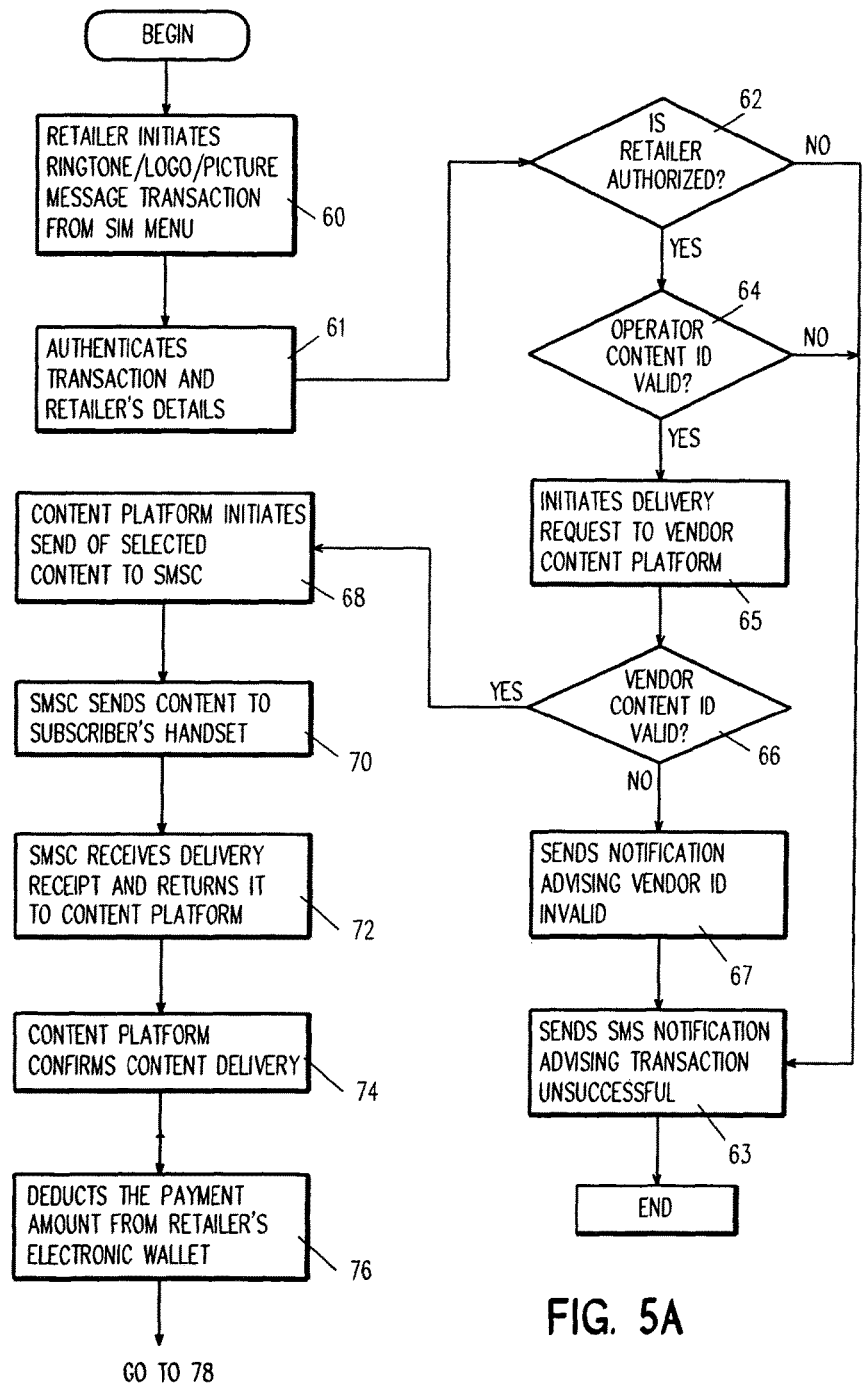
FIGS. 5A and 5B show a flowchart of a content purchase transaction in the form of a ring tone using the system of FIGS. 1 and 2.
Figure 5B:
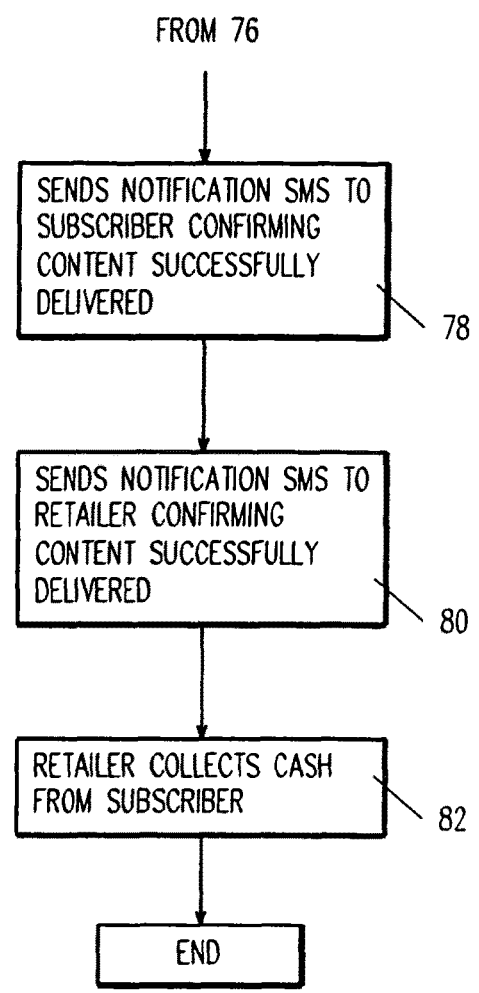

Referring to FIG. 5 (comprising FIGS. 5A and 5B), there is shown an exemplary flow chart of a content purchase transaction in the form of a ring tone purchase transaction using the system of the present invention that enables a pre-pay or post-paid mobile phone subscriber to receive digital content on his/her handset. This is achieved by delivering physical currency to an authorized retailer 10.

Here, the mobile phone service subscriber selects a specific ring tone, for example, and provides the mobile operator or retailer 10 with the content ID number and his/her mobile phone number. Alternatively and optionally, the subscriber may select a specific logo or picture message. The retailer 10 then uses a mobile phone 12 as a point-of-sale device to initiate the ring tone purchase transaction by accessing a M-Commerce server 16 menu (operation 60).

Preferably, the SIM application menu displays appropriate prompts for the retailer 10 to enter the data provided by the subscriber. The SIM menu may include such prompts as: "Please enter Purchasing Subscriber mobile number"; "Please enter Target Subscriber mobile number" (if this entry is left blank, then the system defaults to the subscriber's MSISDN); "Please enter Content ID"; "Enter your M-PIN"; "Confirm sale of <Content ID> to "MSISDN>". After the retailer 10 enters its merchant identification number (i.e. M-PIN), the retailer 10 confirms the transaction.

Note the option to include a different 'target' MSISDN in addition to the subscriber's MSISDN, if desired. This option allows the mobile phone service subscriber to purchase VAS content or enhanced service(s) for family members, friends, colleagues, and others.

The SIM application constructs an encrypted content purchase SMS message containing the entered data, and sends the message to a SMS center 24, which in turn routes the content purchase message to the M-Commerce server 16. The M-Commerce server 16 then determines that the content purchase SMS message is a content purchase transaction, decrypts the message, and authenticates the retailer's details on the e-Wallet server 22 (operation 61). In addition, the M-Commerce server 16 forwards a delivery request to the VAS server 18, passing along the retailer's MSISDN and the content ID.

At operation 62, a decisional issue is whether the retailer 10 is authorized to sell the designated content. The goal here is to prevent the unauthorized sale of electronic content by an unauthorized retailer 10 in addition to preventing the sale of unauthorized content to a mobile phone service subscriber. If the retailer 10 is not authorized to sell the designated content, the VAS server 18 does not validate the retailer 10 for that sale transaction. Accordingly, the VAS server 18 sends a non-validation notification to the M-Commerce server 16, which then sends a notification SMS message to the retailer 10 and mobile phone service subscriber that the transaction was unsuccessful (operation 63).

On the other hand, if the retailer 10 is determined to be authorized to sell the designated content, the next decisional issue is whether the mobile operator's content ID is valid (operation 64). If not, the VAS server 18 notifies the M-Commerce server 16, which in turn sends a notification SMS message to the retailer 10 and the mobile phone service subscriber advising of the failure of the submitted request (operation 63). Exemplary failure notification SMS messages are as earlier described.

However, if the operator's content ID is valid, then the VAS server 18 retrieves the corresponding mobile operator's (or other authorized content provider's) content ID, retail price and retailer commission and passes this information to the M-Commerce server 16. The M-Commerce server 16 requests the e-Wallet server 22 to verify that the retailer has sufficient funds in its wallet and to reserve the retail price less retailer commission. The M-Commerce server 16 then requests the VAS server 18 to initiate the content delivery request to the vendor content delivery platform 21 (operation 65), preferably passing along the target mobile phone service subscriber's MSISDN, content ID and M-Commerce server transaction ID.

The next question now is whether the vendor content ID is valid (operation 66). If not, the vendor content delivery platform 21 sends a non-validation notification that the vendor ID is invalid to the VAS server 18. The VAS server 18 notifies the M-Commerce server 16, which then sends a notification SMS message to the retailer 10, the vendor, and the mobile phone service subscriber advising of the failure of the submitted request (operation 67).

On the other hand, if the vendor content ID is deemed valid, the vendor content delivery platform 21 sends the designated content to the SMS center 24 (operation 68).

At operation 70, the SMS center 24 sends the content (i.e. the selected ring tone) to the mobile phone service subscriber's handset as a once-only, one-shot dispatch. In other words, there are no transmission re-tries of the content. The SMS center 24 then receives the delivery receipt and returns delivery confirmation to the vendor content delivery platform 21 (operation 72), which confirms the content delivery was successful (operation 74) and sends a positive response back to the VAS server 18.

The VAS server 18 notifies the M-Commerce server 16, which instructs the e-Wallet server 22 to deduct the payment amount from the retailer's electronic wallet account (operation 76). Accordingly, the M-Commerce server 16 sends a notification SMS message to the mobile phone service subscriber (operation 78) and retailer 10 (operation 80) confirming that the content has been successfully delivered.

The respective notification messages are as similar to the ones earlier described. For example, where the subscriber has provided target subscriber information, then a successfully SMS notification message may contain the following information: date/time, the retailer's MSISDN, the target subscriber's MSISDN, the e-wallet platform's transaction number, and the payment amount.

The retailer 10 collects the currency from the subscriber (operation 82) to end the transaction.

In instances where a transaction is unsuccessful, the reserved amount from the retailer's e-wallet is cancelled and the e-wallet is not debited.

Figure 6A:
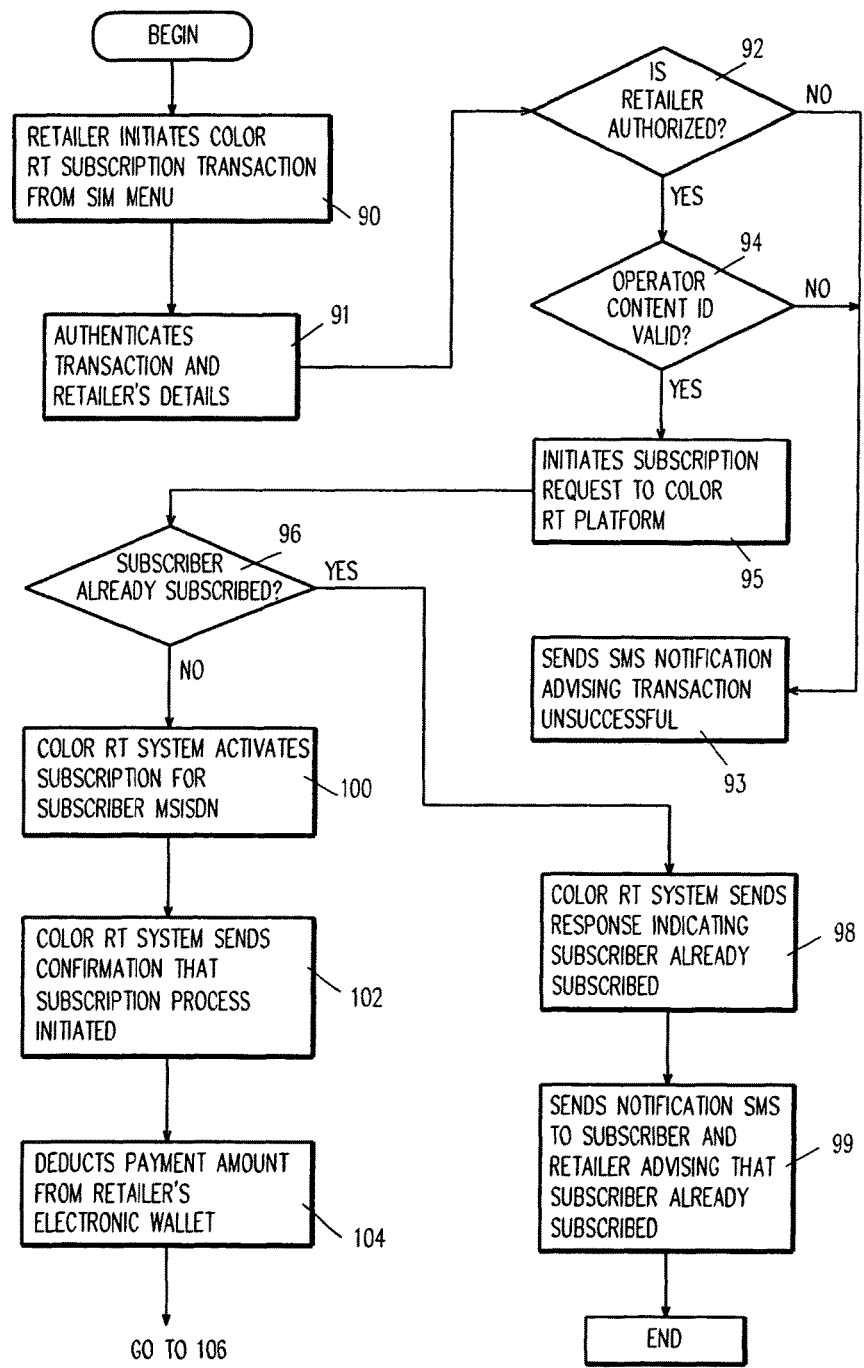
FIGS. 6A and 6B show a flowchart of an enhanced service subscription purchase transaction in the form of a color ring tone using the system of FIGS. 1 and 2.
Figure 6B:
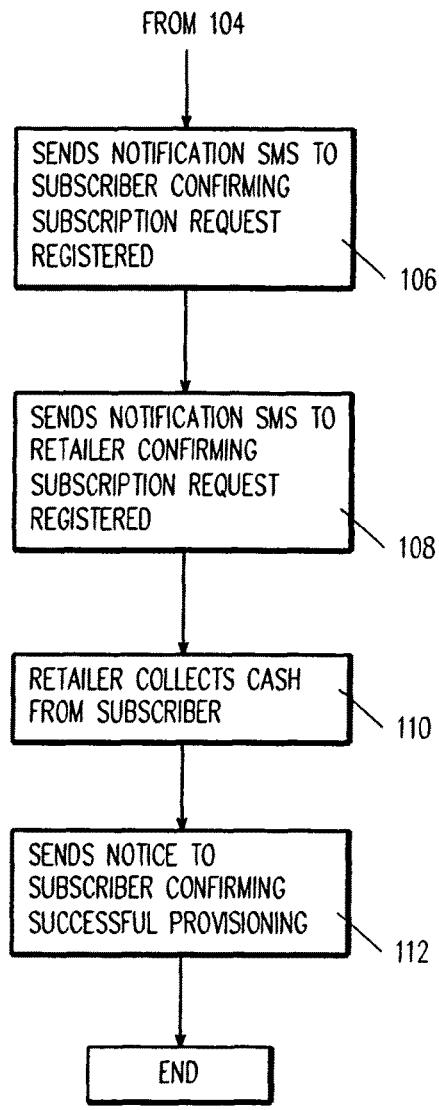

Referring now to FIG. 6 (comprising FIGS. 6A and 6B), a flow chart of an enhanced service subscription purchase transaction in the form of a color ring tone, is illustrated. A color ring tone (or 'ring back tone') is best described as an audio file, which is usually a recording of a song, that a caller hears when the caller calls another subscriber of the color ring tone service. The song replaces the normal telephone ring tone that one would otherwise hear when one calls another. The audio file is preferably, though not necessarily, stored on a central server connected to a mobile operator's network.

In the transaction depicted in FIG. 6, the pre-pay or post-paid mobile phone service subscriber provides the retailer 10 with his/her mobile phone number (MSISDN) to subscribe to the color ring tone service. The retailer 10 then uses a mobile phone 12 as a point-of-sale device to initiate the color ring tone subscription transaction from the SIM menu (operation 90).

Preferably, the SIM application menu displays appropriate prompts, as earlier described, for the retailer 10 to enter the data provided by the subscriber. The retailer 10 then enters its M-PIN and confirms the transaction. Alternatively and/or optionally, the SIM menu may provide for the entering of a target subscriber MSISDN, which is different from the subscriber's MSISDN. This enables subscribers to purchase gift VAS service(s) for family, friends and others.

The SIM application constructs an encrypted color ring tone subscription SMS message containing the entered data, and sends the message to a SMS center 24. The SMS center 24 routes the color ring tone subscription message to the M-Commerce server 16, which determines that the color ring tone subscription message is a color ring tone subscription transaction, decrypts the message, and authenticates the retailer's details (operation 91) on the e-Wallet server 22. In addition, the M-Commerce server 16 forwards a subscription request to the VAS server 18 (operation 91), preferably passing along the retailer's MSISDN and the content ID.

At operation 92, a decisional issue is whether the retailer 10 is authorized to sell the designated enhanced service. The goal here is to prevent the unauthorized sale of subscription services by an unauthorized retailer 10 in addition to preventing the sale of unauthorized enhanced services to a mobile phone service subscriber. If the retailer 10 is not authorized to sell the designated enhanced service, the VAS server 18 does not validate the retailer 10 for that sale transaction. The VAS server 18 sends a non-validation notification to the M-Commerce server 16, which then sends a notification SMS message to the retailer 10 and mobile phone service subscriber that the transaction was unsuccessful (operation 93).

If the retailer 10 is deemed to be authorized to sell the designated enhanced service, the next question is whether the mobile operator's content ID is valid (operator 94). If not, the VAS server 18 does not validate the mobile operator for that sale transaction. The VAS server 18 sends a non-validation notification to the M-Commerce server 16, which then sends a notification SMS message to the retailer 10, the mobile operator and the mobile phone service subscriber that the transaction was unsuccessful (operation 93).

However, if the operator content ID is deemed valid, then the VAS server 18 retrieves the corresponding mobile operator's (or other authorized content provider's) content ID, retail price and retailer commission and passes this information to the M-Commerce server 16. The M-Commerce server 16 requests the e-Wallet server 22 to verify that the retailer has sufficient funds in its electronic wallet and to reserve the retail price less retailer commission. The M-Commerce server 16 then requests the VAS server 18 to initiate the subscription request to the color ring tone platform 17 (operation 95), preferably passing along the target mobile phone service subscriber's MSISDN, content ID and M-Commerce server transaction ID.

The next decisional issue is whether the subscriber has already subscribed to the color ring tone subscription service (operation 96). If so, the color ring tone platform 17 sends a notification to the VAS server 18 that the subscriber is already subscribed (operation 98). The VAS server 18 notifies the M-Commerce server 16, which then sends a notification SMS message to the retailer 10 and mobile phone service subscriber advising that the subscriber is already an existing customer (operation 99).

However, if the subscriber has not previously subscribed to the color ring tone service, then the color ring tone platform 17 activates a subscription for the desired subscriber MSISDN (operation 100). The color ring tone platform 17 then sends confirmation to the VAS server 18 that the subscription process has been initiated (operation 102). The VAS server 18 notifies the M-Commerce server 16, which instructs the e-Wallet server 22 to deduct the payment amount, preferably a recommended retail price less commission, from the retailer's electronic wallet account (operation 104), and sends a notification SMS message to the subscriber (operation 106) and retailer 10 (operation 108) confirming that the subscription request has been registered and when service will be provided. The respective notification messages are similar to the ones earlier described.

The retailer 10 collects the currency from the subscriber (operation 110). When the color ring tone platform 17 completes the subscription process, it sends a notice to the subscriber confirming successful provisioning of the service (operation 112).

Figure 7A:
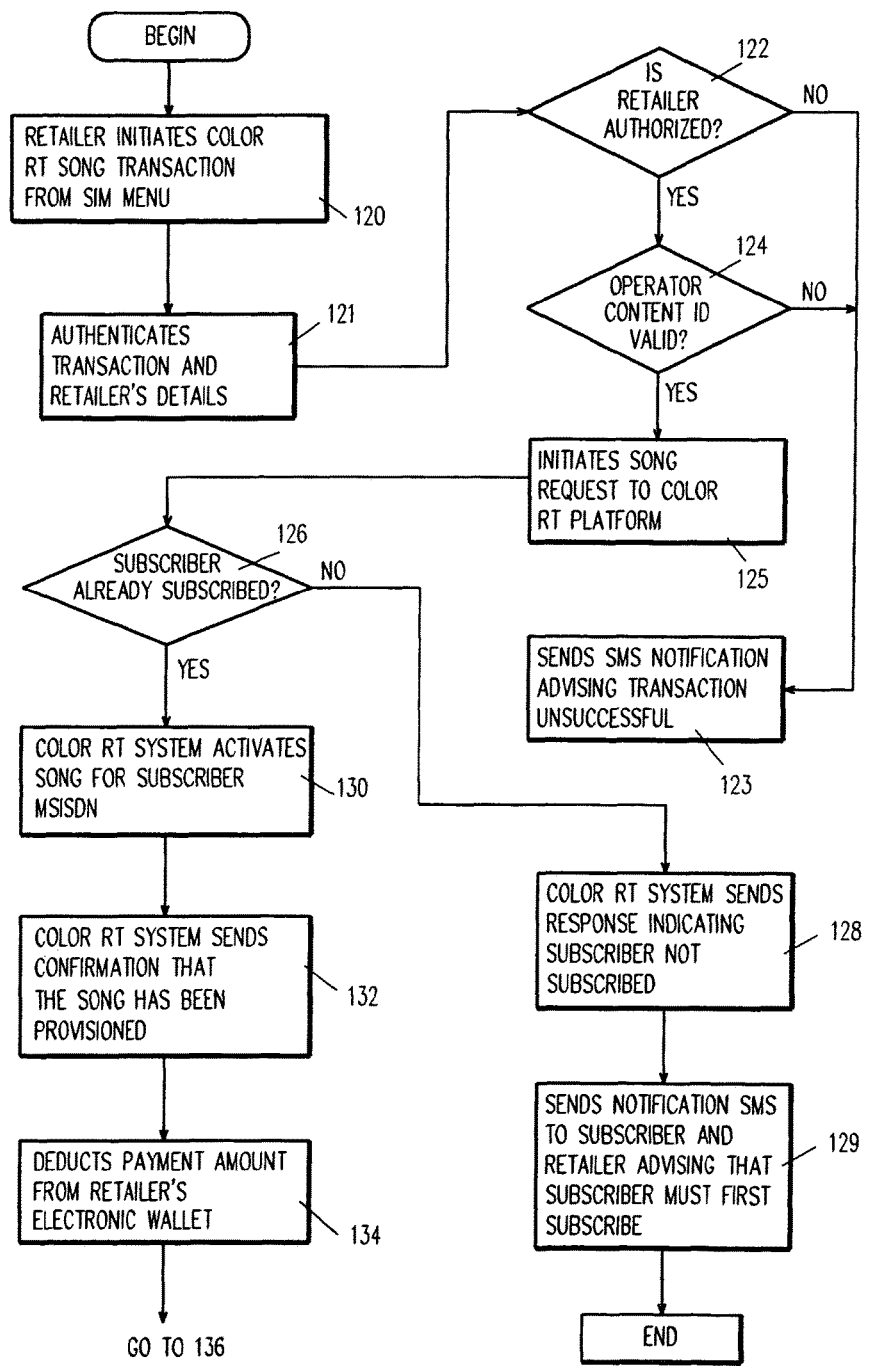
FIGS. 7A and 7B show a flowchart of an enhanced service subscription transaction in the form of a color ring tone song purchase transaction using the system of FIGS. 1 and 2.
Figure 7B:
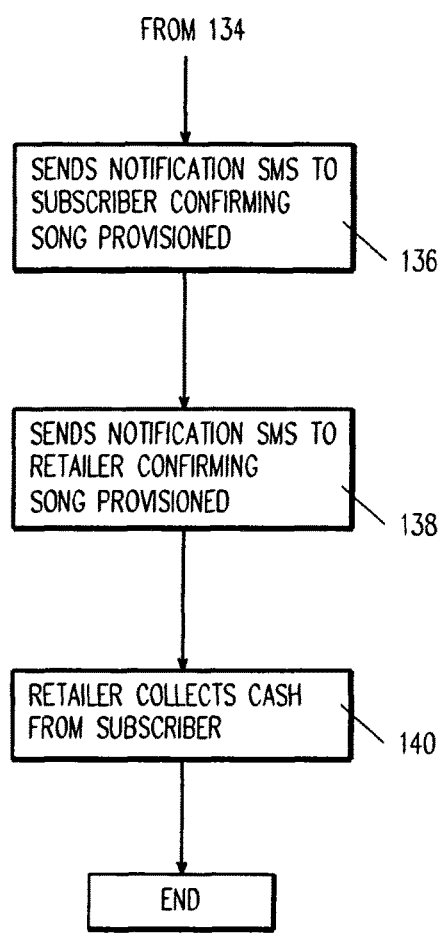

The decisional operations of FIG. 7 (comprising FIGS. 7A and 7B) showing a flow chart of an enhanced service subscription purchase transaction in the form of a color ring tone song purchase, in accordance with the present invention, is similar to the decisional operations of FIG. 6, except that the transaction is allowed to proceed only if the subscriber has previously subscribed to the service. In other words, if the mobile phone user was not previously subscribed, then the subscriber and retailer receive notifications instructing the user to subscribe to the color ring tone service first.

To explain further, referring to FIG. 7A, the subscriber provides the retailer 10 with his/her selection of a desired song by way of a content ID number and his/her mobile phone number. The retailer 10 then uses a mobile phone 12 as a point-of-sale device to initiate the song purchase transaction (operation 120).

Preferably, the SIM application menu displays appropriate prompts for the retailer 10 to enter the data provided by the subscriber. For example, the SIM menu may include such prompts as: "Please enter Purchasing subscriber mobile number"; "Please enter Target Subscriber mobile number"; "Please enter Content ID"; "Enter your M-PIN"; "Confirm sale of <content ID> to <MSISDN>". The retailer 10 enters its merchant identification number (i.e. M-PIN) and confirms the transaction.

Note the option to include a prompt directed to target subscriber information, if desired. This option allows the mobile phone service subscriber to purchase VAS content and/or enhanced services for one or more family members, friends and others as a gift.

The SIM application preferably constructs an encrypted song selection SMS message containing the entered data, and sends the message to a SMS center 24, which in turn routes the song purchase SMS message to the M-Commerce server 16, which determines that the song purchase SMS message is a song purchase transaction, decrypts the message, and authenticates the retailer's details (operation 121) on the e-Wallet server 22. Additionally, the M-Commerce server 16 transmits an initiate-song request to the VAS server 18, passing along the retailer's MSISDN and the content ID.

At operation 122, a decisional issue is whether the retailer 10 is authorized to sell the designated enhanced service. The goal here is to prevent the unauthorized sale of subscription services by an unauthorized retailer 10 in addition to preventing the sale of unauthorized enhanced services to a mobile phone service subscriber. If the retailer 10 is not authorized to sell the designated enhanced service, the VAS server 18 does not validate the retailer 10 for that sale transaction. The VAS server 18 sends a non-validation notification to the m-Commerce server 16, which then sends a notification SMS message to the retailer 10 and mobile phone service subscriber that the transaction was unsuccessful (operation 123).

If the retailer 10 is deemed to be authorized to sell the designated enhanced service, the next question is whether the mobile operator's content ID is valid (operation 124). If not, the VAS server 18 does not validate the mobile operator for that sale transaction. The VAS server 18 sends a non-validation notification to the m-Commerce server 16, which then sends a notification SMS message to the retailer, the mobile operator and the mobile phone service subscriber that the transaction was unsuccessful (operation 123).

However, if the operator content ID is deemed valid, then the VAS server 18 retrieves the corresponding mobile operator's (or other authorized content provider's) content ID, retail price and retailer commission and passes this information to the M-Commerce server 16. The M-Commerce server 16 requests the e-Wallet server 22 to verify that the retailer has sufficient funds in its electronic wallet and to reserve the retail price less retailer commission. The M-Commerce server 16 then requests the VAS server 18 to initiate the song request to the color ring tone platform 17 (operation 125), preferably passing along the target mobile phone service subscriber's MSISDN, content ID and M-Commerce server transaction ID.

The next decisional issue is whether the subscriber is already a subscribing customer (operation 126). If not, the color ring tone platform 17 sends a response to the VAS server 18 that the subscriber is not a current customer (operation 128). The VAS server 18 notifies the M-Commerce server 16, which then sends a notification SMS message to the subscriber and retailer 10 advising the subscriber of the need to enroll in the subscription first (operation 129). The failure notification message is similar to earlier ones described herein.

However, if the subscriber is found to be an existing customer, then the color ring tone platform 17 activates the selected song request and delivers the selected song to the subscriber (operation 130). The color ring tone platform 17 also sends confirmation to the VAS server 18 that the song has been delivered (operation 132). The VAS server 18 notifies the M-Commerce server 16, which instructs the e-Wallet server 22 to deduct the payment amount, preferably a recommended retail price less commission, from the retailer's electronic wallet account (operation 134), and sends notification messages to the subscriber (operation 136) and retailer 10 (operation 138) confirming that the selected song was activated for the pre-pay or postpaid mobile phone subscriber's service. The respective notification messages are similar to the ones earlier described. At operation 140, the retailer 10 collects cash currency from the subscriber.

Figure 8A:
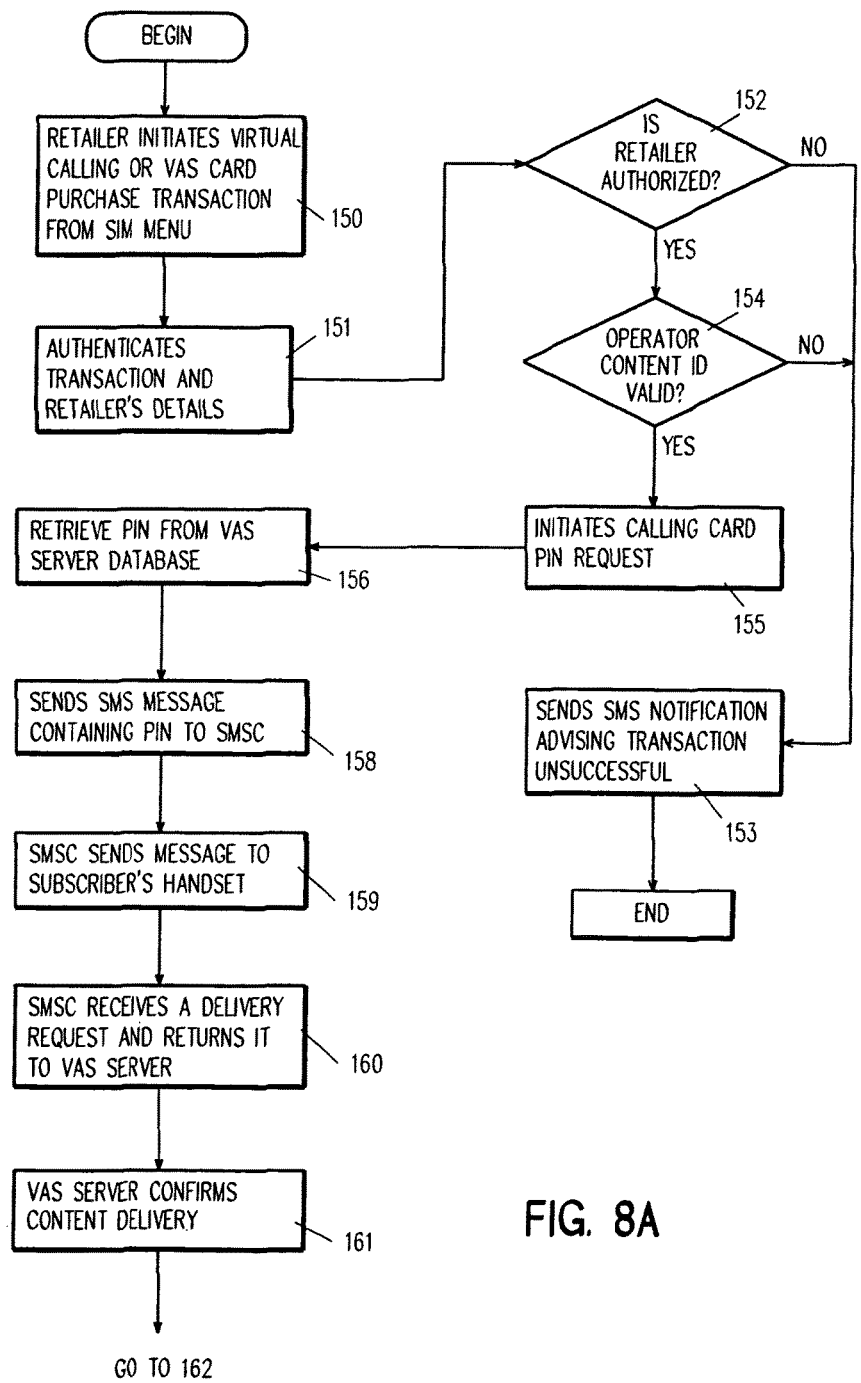
FIGS. 8A and 8B show a flowchart of an enhanced service purchase transaction in the form of a virtual calling card using the system of FIGS. 1 and 2.
Figure 8B:
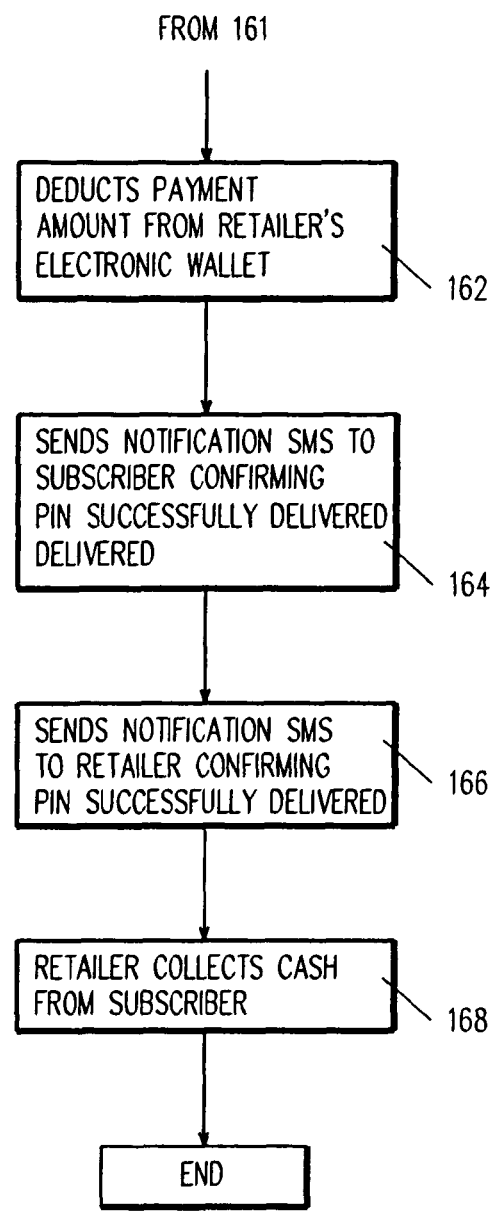

Referring now to FIG. 8 (comprising FIGS. 8A and 8B), there is shown a flow chart of an enhanced service purchase transaction in the form of a virtual calling card. In this instance, the subscriber generally requests a card product, such as a virtual calling card or a VAS card, from the retailer 10. Using the mobile phone 12 as a point-of-sale device, the retailer 10 initiates a card purchase transaction from the SIM menu (operation 150), entering pertinent details provided by the subscriber.

As earlier described, the SIM menu is user-friendly, providing appropriate prompts of the necessary input information. In addition, the menu similarly provides for the option of gift card or VAS service(s) purchase for family and friends.

Upon confirmation of the transaction by the retailer 10, the SIM application constructs an encrypted virtual calling card and/or VAS card SMS message containing the entered data, and sends the message to a SMS center 24. For simplicity, the discussion will be had to a calling card product although it may be a calling card and/or a VAS card.

The SMS center 24 routes the card purchase SMS message to the M-Commerce server 16, which determines that the card purchase SMS message is a calling card purchase transaction, decrypts the message, and authenticates the retailer 10 details (operation 151) on the e-Wallet server 22. Additionally, the M-Commerce server 16 transmits a retrieve PIN request to the VAS server 18, passing along the Retailer's MSISDN and the service ID.

At operation 152, a decisional issue is whether the retailer 10 is authorized to sell the designated enhanced service. The goal here is to prevent the unauthorized sale of calling card services by an unauthorized retailer 10 in addition to preventing the sale of unauthorized enhanced services to a mobile phone service subscriber. If the retailer 10 is not authorized to sell the designated enhanced service, the VAS server 18 does not validate the retailer 10 for that sale transaction. The VAS server 18 sends a non-validation notification to the M-Commerce server 16, which then sends a notification SMS message to the retailer 10 and mobile phone service subscriber that the transaction was unsuccessful (operation 153).

If the retailer 10 is deemed to be authorized to sell the designated enhanced service, the next question is whether the mobile operator's content ID is valid (operation 154). If not, the VAS server does not validate the mobile operator for that sale transaction. The VAS server 18 sends a non-validation notification to the m-Commerce server 16, which then sends a notification SMS message to the retailer 10, the mobile operator and the mobile phone service subscriber that the transaction was unsuccessful (operation (153).

However, if the operator content ID is deemed valid, then the VAS server 18 retrieves the corresponding mobile operator's (or other authorized content provider's) content ID, retail price and retailer commission and passes this information to the M-Commerce server 16. The M-Commerce server 16 requests the e-Wallet server 22 to verify that the retailer has sufficient funds in its electronic wallet and to reserve the retail price less retailer commission. The M-Commerce server 16 then requests the VAS server 18 to initiate a calling card PIN request to the vendor content delivery platform 21 (operation 155), preferably passing along the target mobile phone service subscriber's MSISDN, content ID and M-Commerce server transaction ID. The vendor content delivery platform returns a content ID validation notification to the VAS server 18, which selects an identification number (PIN) from a calling card PIN database (operation 156).

At operation 158, the VAS server 18 transmits a SMS message containing the PIN to the SMS center 24, which in turn dispatches a message to the target MSISDN as a once-only transmission (operation 159). The SMS center 24 receives a receipt of the calling card information delivery and passes along the delivery receipt confirmation to the VAS server 18 (operation 160), which confirms the content delivery was successful (operation 161) and sends a positive response back to the M-Commerce server 16.

The M-Commerce server 16 instructs the e-Wallet server 22 to deduct the payment amount, preferably the recommended retail price less retailer commission, from the retailer's electronic wallet account (operation 162). The M-Commerce server 16 sends a notification SMS message to the subscriber (operation 164) and retailer 10 (operation 166) confirming that the PIN was successfully delivered. The respective notification messages are similar to the ones earlier described. The transaction concludes when the retailer 10 collects cash currency from the mobile phone service subscriber (operation 168).

Figure 9A:
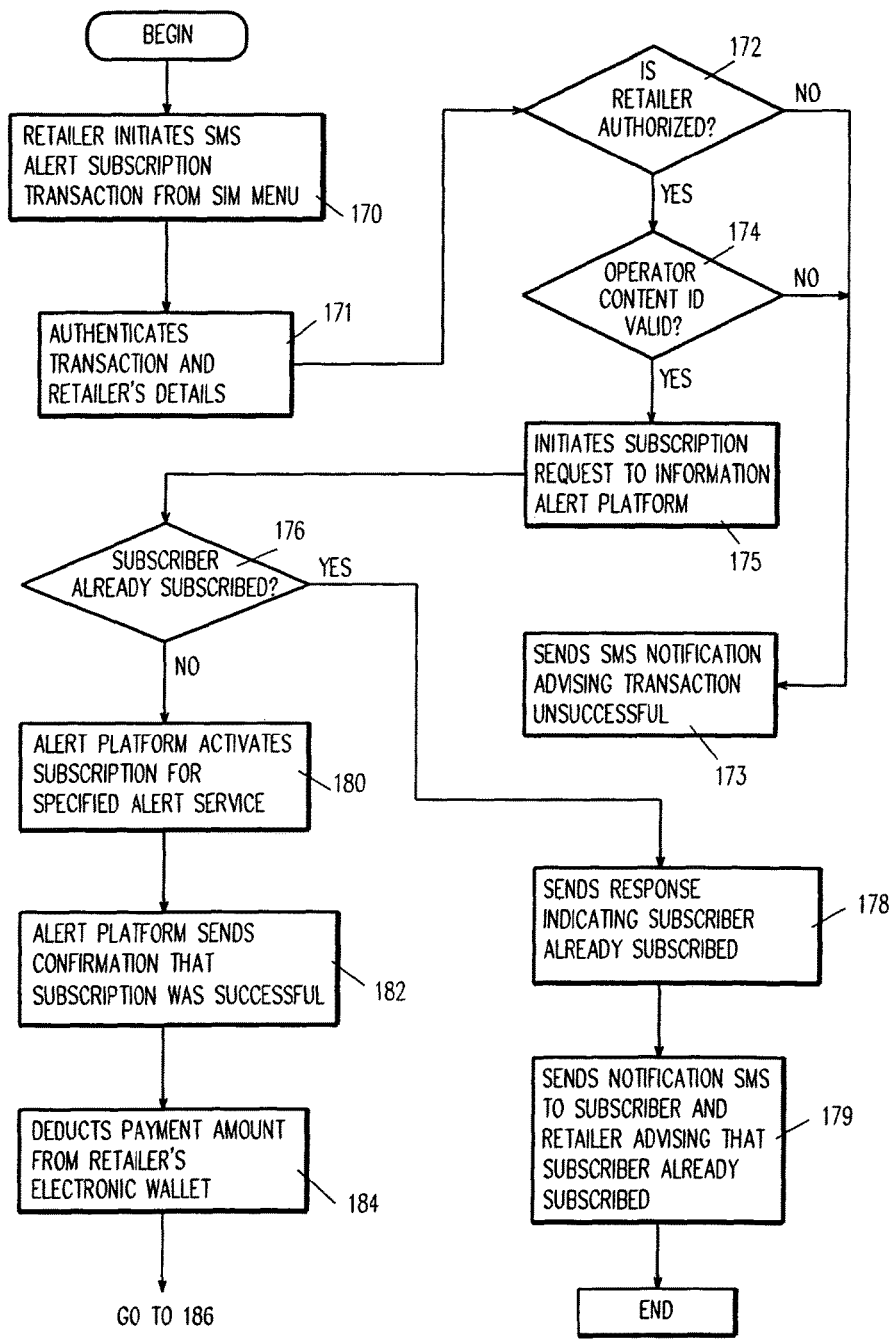
FIGS. 9A and 9B show a flowchart of an enhanced service subscription transaction in the form of an alert service using the system of FIGS. 1 and 2.
Figure 9B:
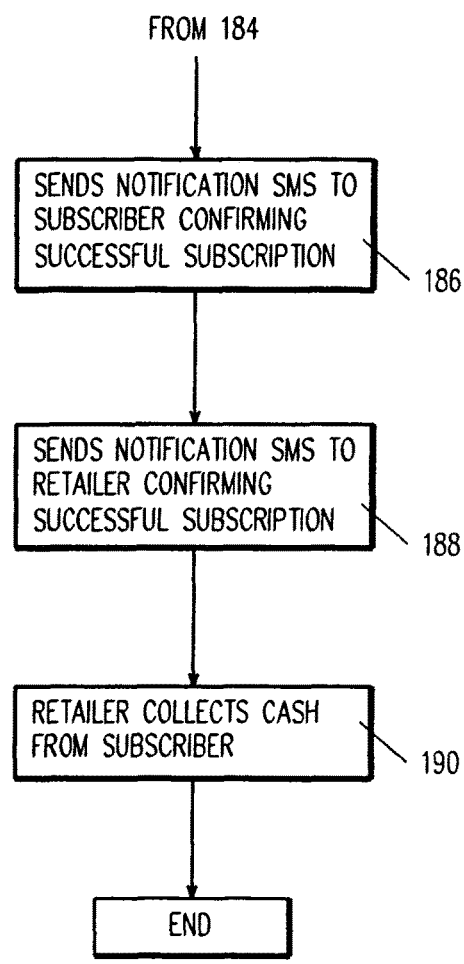

Referring now to FIG. 9 (comprising FIGS. 9A and 9B), a flow chart of an enhanced service subscription purchase transaction in the form of an alert service, using the system of the present invention, is illustrated. In this scenario, the subscriber provides the retailer 10 with his/her selection of information alert(s), such as news, weather, or the like, and mobile phone number (MSISDN) to subscribe to the information alert service. The retailer then uses a mobile phone 12 as a point-of-sale device to initiate the information subscription purchase transaction from the SIM menu (operation 170).

Preferably, the SIM application menu displays appropriate prompts, as earlier described, for the retailer 10 to enter the data provided by the subscriber. The retailer 10 then enters its M-PIN and confirms the transaction. Alternatively and/or optionally, the SIM menu may provide for the entering of a target subscriber MSISDN, which is different from the subscriber's. This enables subscribers to purchase one or more gift VAS services for family, friends and others.

The SIM application constructs an encrypted information alert subscription SMS message containing the entered data, and sends the message to a SMS center 24. The SMS center 24 routes the information alert subscription message to the M-Commerce server 16, which determines that the information alert subscription SMS message is an information alert subscription transaction, decrypts the message, authenticates the retailer's details on the e-Wallet server 22 (operation 171).

At operation 172, a decisional issue is whether the retailer 10 is authorized to sell the designated enhanced service. The goal here is to prevent the unauthorized sale of subscription services by an unauthorized retailer 10 in addition to preventing the sale of unauthorized enhanced services to a mobile phone service subscriber. If the retailer 10 is not authorized to sell the designated enhanced service, the VAS server 18 does not validate the retailer 10 for that sale transaction. The VAS server 18 sends a non-validation notification to the M-Commerce server 16, which then sends a notification SMS message to the retailer 10 and mobile phone service subscriber that the transaction was unsuccessful (operation 173).

If the retailer 10 is deemed to be authorized to sell the designated enhanced service, the next question is whether the mobile operator's content ID is valid (operation 174). If not, the VAS server 18 does not validate the mobile operator for that sale transaction. The VAS server 18 sends a non-validation notification to the m-Commerce server 16, which then sends a notification SMS message to the retailer 10, the mobile operator and the mobile phone service subscriber that the transaction was unsuccessful (operation 93).

However, if the operator content ID is deemed valid, then the VAS server 18 retrieves the corresponding mobile operator's (or other authorized content provider's) content ID, retail price and retailer commission and passes this information to the M-Commerce server 16. The M-Commerce server 16 requests the e-Wallet server 22 to verify that the retailer has sufficient funds in their wallet and to reserve the retail price less retailer commission. The M-Commerce server 16 then requests the VAS server 18 to initiate the subscription request to the information alert platform 23 (operation 175), preferably passing along the target mobile phone service subscriber's MSISDN, content ID and M-Commerce server transaction ID.

At operation 176, the next decisional issue is whether the subscriber is already a customer of the information alert subscription service. If so, the information alert platform 23 informs the VAS server 18 that the subscriber is already subscribed (operation 178). The VAS server 18 notifies the M-Commerce server 16, which then sends a notification SMS message to inform the mobile phone service subscriber and retailer 10 that the subscriber is already an existing customer (operation 179).

However, if the subscriber is not an existing customer of the subscription service, then the information alert platform 23 activates a subscription for the specified alert service (operation 180). The information alert platform 23 then sends a confirmation to the VAS server 18 that the subscription process has been initiated and was successful (operation 182). The VAS server 18 notifies the M-Commerce server 16, which instructs the e-Wallet server 22 to deduct the payment amount, preferably the recommended retail price less commission, from the retailer's electronic wallet account (operation 184), and sends a notification SMS message to the subscriber (operation 186) and the retailer 10 (operation 188) confirming successful subscription. The respective notification messages are similar to the ones earlier described. The transaction concludes when the retailer 10 collects cash currency from the subscriber (operation 190).

Having now described a few embodiments of the invention, it should be apparent to those skilled in the art that the foregoing is merely illustrative and not limiting, having been presented by way of example only. The above embodiments are only to be construed as examples of the various different types of computer systems that may be utilized in connection with the computer-implemented and/or computer-assisted process of the present invention. Numerous modifications and other embodiments are within the scope of the invention and any equivalent thereto. It can be appreciated that variations to the present invention would be readily apparent to those skilled in the art, and the present invention is intended to include those alternatives.

Further, since numerous modifications will readily occur to those skilled in the art, it is not desired to limit the invention to the exact construction and operation illustrated and described, and accordingly, all suitable modifications and equivalents may be resorted to as falling within the scope of the invention.

What is claimed is:

1. A system which provides content and services to a mobile phone service subscriber, the system comprising:

(a) a plurality of third-party network platforms operated by respective third-party service providers, each of the third-party network platforms offering content or a service to mobile phone service subscribers;

(b) a mobile commerce server which manages an end-to-end mobile commerce transaction between the mobile phone service subscriber and a selected one of the plurality of third-party service providers, and which receives data associated with the end-to-end mobile commerce transaction from a wireless communication device acting as a point-of-sale device for a retailer, which data comprises an identification of a mobile account of the mobile phone service subscriber and an identification of a selected content or service offered by the third-party network platform of the selected third-party service provider;

(c) a value-added services server which manages transactional processing between the retailer and the third-party network platform of the selected third-party services provider, and which triggers delivery of the selected content or service to the mobile phone service subscriber from the third-party network platform of the selected third-party service provider; and (d) an electronic wallet server which manages interactions with a virtual wallet account of the retailer.

2. The system according to claim 1, wherein the value-added services server comprises an identification database which manages each identification number for the content or service offered by each of the plurality of third-party network platforms.

3. The system according to claim 1, wherein one of the plurality of third-party network platforms comprises a content interface which manages a transaction load of the one of the plurality of third-party network platforms to deliver content.

4. The system according to claim 1, wherein one of the third-party network platforms comprises a postpaid interface which manages a transaction load of the one of the plurality of third-party network platforms to deliver a postpaid billing service.

\* \* \* \* \*